United States Patent

[11] 3,622,809

[72] Inventor Peter R. Williams
Wilton, Conn.
[21] Appl. No. 806,472
[22] Filed Mar. 12, 1969
[45] Patented Nov. 23, 1971
[73] Assignee Chemical Bank
New York, N.Y.

[54] ACTIVE DELAY LINE
14 Claims, 4 Drawing Figs.

[52] U.S. Cl. .......... 307/293, 307/218, 328/55
[51] Int. Cl. .......... H03k 17/28
[50] Field of Search .......... 307/208, 218, 293, 300, 303; 328/55, 56

[56] References Cited
UNITED STATES PATENTS

| | | | |
|---|---|---|---|
| 3,223,981 | 12/1965 | Fisher | 328/55 X |
| 3,248,657 | 4/1966 | Turecki | 328/55 |
| 3,386,036 | 5/1968 | Gerrard et al. | 328/56 |
| 3,502,994 | 3/1970 | Ott et al. | 328/55 X |
| 3,466,575 | 9/1969 | Chang | 307/293 X |

OTHER REFERENCES

Hilton, " Voltage Variable Delay Line," IBM Technical Disclosure Bulletin Vol. 11 No. 1, June 1968 p. 45

Lohman et al, " Transistor Circuits with Adjustable Time Delays," RCA Technical Notes, RCA TN No. 128, Mar. 12, 1958

Widmer, " Pulse Pattern Generator, Counter Timing Circuit," IBM Technical Disclosure Bulletin, Vol. 6, No. 9, Feb. 1964, pp. 71, 72

*Primary Examiner*—Roy Lake
*Assistant Examiner*—James B. Mullins
*Attorney*—Morgan, Finnegan, Durham & Pine

ABSTRACT: An electrical delay line including a series of active stages interconnected so that the leading edge of the pulses being propagated through the active stages connected in cascade controls both the turn-on and turnoff of the delayed output pulses to provide delayed pulses having constant amplitude and constant width.

INVENTOR
PETER R. WILLIAMS
BY
Morgan, Finnegan, Durham & Pine
ATTORNEYS

INVENTOR
PETER R. WILLIAMS
BY
Morgan, Finnegan, Durham & Pine
ATTORNEYS

ACTIVE DELAY LINE

BACKGROUND OF THE INVENTION

This invention relates to delay lines and, more particularly, to tapped delay lines capable of providing a plurality of output pulses at increasingly greater time delays.

A delay line is usually thought of as being basically a transmission line through which electrical pulses are propagated. If the transmission line is properly terminated and the energy dissipation is low, a fairly accurate reproduction of the applied pulse appears at the output of the delay line after a predetermined period of time as determined by the transmission line characteristics. In some cases coaxial transmission lines, sonic transmission lines and the like are used in delay line structures, but, more often, the transmission line is synthesized through the use of lumped constants. Usually, the delay line is adapted so that the total delay can be broken into smaller, usually equal, increments.

With the transmission line type delay line, it has been found that the pulse deteriorates rapidly as it is propagated down the delay line. The amplitude of the pulse decreases due to resistance in the line. Perhaps more serious is the change in pulse width, since the pulse has a tendency to spread and become increasingly wider as it travels down the line. Also, the pulse shape deteriorates. These delay lines cannot be used where a large number of successive delays is required or where the output pulse must have substantially the same width and shape at each point along the delay line and, hence, their use is somewhat limited.

SUMMARY OF THE INVENTION

The delay line, according to this invention, provides delayed output pulses which are all substantially of the same width, amplitude and shape.

This delay line takes advantage of a characteristic of solid state circuits which is normally considered a disadvantage, namely, the turn-on delay time. The turn-on delay results when a transistor or comparable solid state device is turned on from the off condition where both transistor junctions are reverse biased. In the off condition, the internal emitter and collector depletion junction layer capacitances, plus any stray capacitances, become charged. When the transistor is turned on, current must flow to these capacitances before any collector current can flow through the transistor. The result is a time delay between the application of an input pulse and the corresponding output pulse developed by the transistor. With present integrated circuits, the turn-on time delay is on the order of 6 to 12 nanoseconds, but can be several times as great, particularly in the poor quality transistors.

A series line of interconnected solid state amplifier circuits is formed. An applied pulse is propagated through the successive solid state amplifiers, being delayed as it passes through each amplifier by a period of time equal to the turn-on delay time of the stage. The amplifiers are operated in their switching mode and, therefore, the amplitude is kept constant as the pulse passes down the line. Also, if amplifier circuits are selected having good rise time characteristics, the leading edge of the pulse remains fairly stable. However, the pulse still has the tendency of changing width because the storage time turnoff delay) is influenced by different factors and, therefore, is of a different magnitude than the turn-on time delay. Normally, the storage time is greater than the turn-on delay and, therefore, the pulse has a tendency to increase in width as it is propagated down the active line.

To eliminate the changing width, additional gate circuits are employed so that the leading edge of the pulse being propagated down the line controls both the turn-on and the turnoff of the delayed output pulses. In this manner the storage time, or turnoff time delay, has no effect upon the output pulse width. The pulse width becomes an exact multiple of the turn-on time delay and can, therefore, be maintained constant throughout the entire delay line.

Since the pulse amplitude and pulse width are maintained substantially constant, virtually as many stages as desired can be added to the delay line.

BRIEF DESCRIPTION OF THE DRAWINGS

The following specification describes, in detail, an illustrative embodiment of the invention. The drawings are part of the specification wherein.

DETAILED DESCRIPTION OF THE INVENTION

Figure 1:
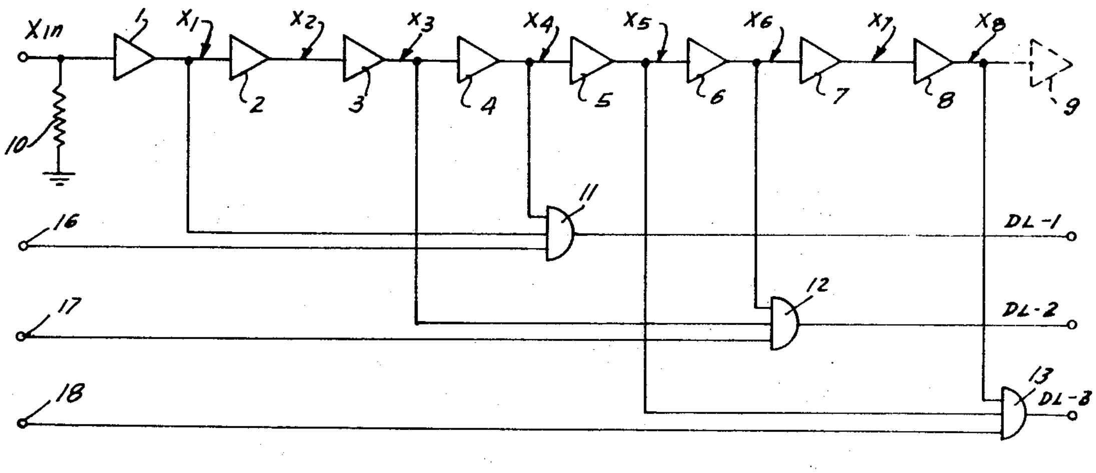
FIG. 1 is a block diagram illustrating the basic interconnection of the delay line according to the invention.

As shown in FIG. 1, a number of amplifiers 1–9 are connected in cascade to form an active delay line. Accordingly, the output of amplifier 1 is connected to the input of amplifier 2, the output of amplifier 2 is connected to the input of amplifier 3, etc. The input pulse is applied to input terminal $X_{in}$ which is coupled to the input of amplifier 1 and is also connected to the ground via an impedance matching resistor 10. Preferably, the amplifiers are designed to operate in their switching mode so that they are either fully nonconductive or fully saturated. In the switching mode, the pulses produced by the amplifiers will maintain a constant amplitude. Each amplifier is of the inverting type and, therefore, when a zero voltage signal appears at the input the output is positive and, likewise, when a positive signal is applied to the amplifier input the output is zero. In most cases, each of the amplifiers will be of the same type so that uniform incremental delays can be obtained.

The first delay line output pulse is developed by an AND-circuit 11 which is coupled to an output terminal DL–1. Two of the inputs for AND-circuit 11 are connected, respectively, to the output of amplifier 1 and to the output of amplifier 4. It should be noted that there are three amplifiers, namely, amplifiers 2, 3 and 4, between the two inputs of AND-circuit 11. Accordingly, since each of the amplifiers is of the inverting type, one of the pulse signals applied to AND-circuit 11 will be inverted relative to the other.

A second output terminal DL–2 provides a somewhat later delayed pulse, as developed by AND-circuit 12. Two of the inputs of AND-circuit 12 are connected to the outputs of amplifiers 3 and 6, respectively. A still later delayed pulse is provided by AND-circuit 13 which is similar fashion has two of its inputs connected to the outputs of amplifiers 5 and 8. The output of AND-circuit 13 is connected to output terminal DL–3 where the third delayed output pulse appears.

In some cases it may be desirable to selectively control the individual delay line output pulses. This is achieved by means of a third input to AND-circuits 11–13, these inputs being connected to control terminals 16–18, respectively. The AND-circuits are designed to normally provide a zero voltage output signal, this being the case if one or more of the inputs are positive. However, if all of the inputs to the AND circuit are simultaneously zero, the AND circuit provides a positive output signal. If a positive signal is applied to one of the terminals 16–18, the corresponding AND circuit is blocked and cannot provide a delayed output pulse.

Figure 2:
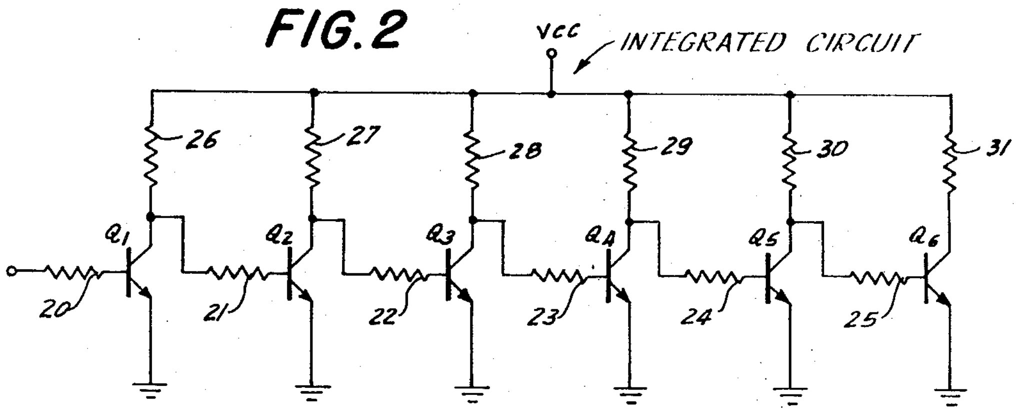
FIG. 2 is a schematic diagram of its interconnected inverter amplifier stages as can be packaged in a single integrated circuit.

The schematic diagram for the individual inverter amplifiers is shown in FIG. 2. The first amplifier includes a transistor Q1 having its base connected to an input terminal via a resistor 20, its emitter connected to ground and its collector connected to a positive supply source via a resistor 26. Transistors Q2–Q6 similarly form amplifiers including collector resistors 27–31 and base resistors 21–25, respectively. The collector of one stage is connected to the base of the following stage through the respective base resistors. Except for the interconnection between the stages, the circuitry shown schematically in FIG. 2 is available as an integrated circuit such as made by Motorola Semi-Conductor Products, Inc., type MC–889. As many inverter amplifiers as desired are interconnected in this fashion using additional integrated circuit monoliths as required. The characteristics of the MC–889 inverter circuit is such that typically it provides a 12-nanosecond turn-on time delay per stage.

Transistors Q1–Q6 are each of the NPN type. Therefore, if a positive signal is applied to the base of transistor Q1 via base resistor 20, the transistor becomes fully conductive to develop a potential drop across resistor 26. As a result, the collector of transistor Q1 drops to a substantially zero value. The zero potential appearing on the collector of transistor Q1 is coupled to the base of transistor Q2 and renders this transistor nonconductive. Accordingly, there is very little potential drop across resistor 27 and the output of transistor Q2, as appears on its collector, is positive. Successive stages operate similarly and each act to invert the applied signal. The output for an amplifier stage are taken from the collector of the transistor.

Figure 3:
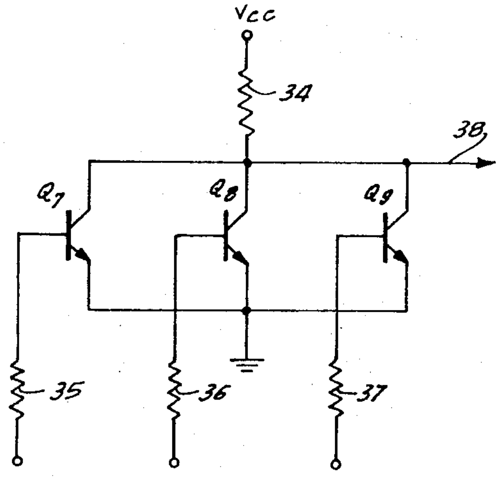
FIG. 3 is a schematic diagram of a three input AND circuit, as is conveniently packaged in a single integrated circuit.

A typical three input AND circuit, as would be found in an integrated circuit, is illustrated in FIG. 3. Normally, several such AND circuits would be packaged in a single integrated circuit monolith. The AND circuit includes three NPN type transistors each having their emitters connected to ground and their collectors connected to a positive source through a common collector resistor 34. The bases of the individual transistors are brought out through respective base resistors 35–37.

When a positive signal is applied to the base of one of the transistors, the transistor becomes conductive and develops a potential drop across collector resistor 34. As a result, the output potential appearing at 38 drops to zero. Hence, a positive signal on one or more of the input terminals causes a zero output potential to appear. On the other hand, if the potential on each of the transistor inputs is zero, none of the transistors is conductive and, therefore, there is no significant potential drop across resistor 34. The result is a positive potential at output 38. The AND circuits will provide a turn-on time delay, but this is insignificant since the time delay will appear at each of the delayed outputs and, therefore, has a self-canceling effect.

An integrated circuit AND circuit suitable for use is type MC–892 made by Motorola Semi-Conductor Products, Inc.

Figure 4:
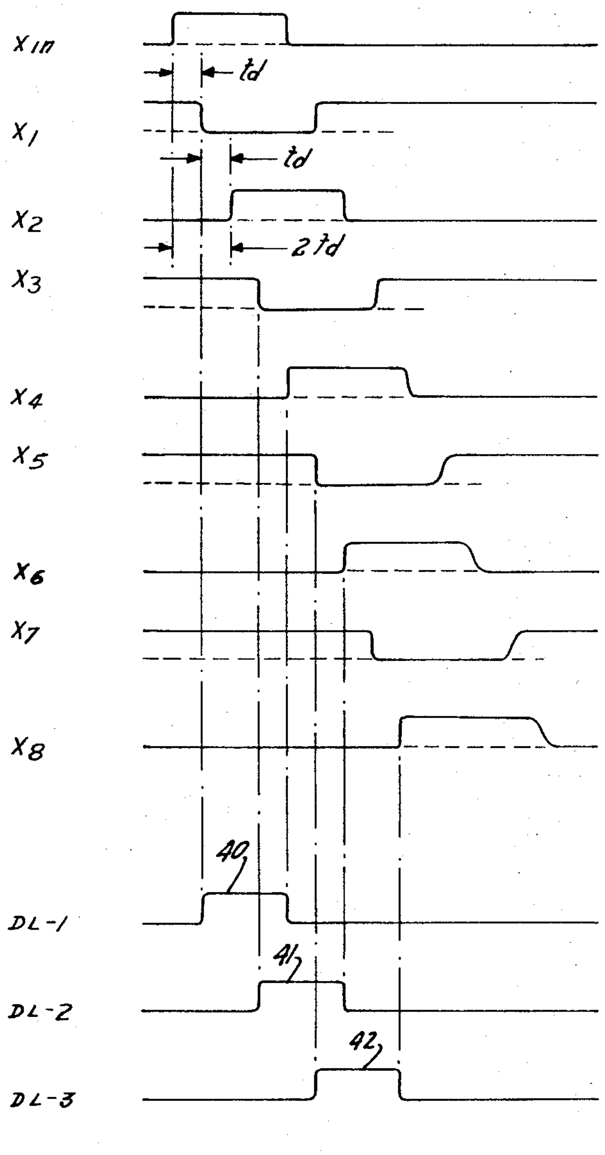
FIG. 4 is a diagram illustrating the wave forms appearing at various points in the delay line shown in FIG. 1.

The wave forms in FIG. 4 illustrate the applied pulse $X_{in}$ and the pulses appearing at the outputs of succeeding amplifier stages ($X_1$–$X_8$). The applied pulse is positive. Amplifier 1 is of the inverting type and, therefore, its output is normally positive but drops to zero for the duration of the propagating pulse. The time delay for the output pulse ($t_d$) is caused by the turn-on time delay of amplifier 1.

At the output of amplifier 2 where signal $X_2$ appears, the signal is again inverted. Normal output of amplifier 2 is zero but the output becomes positive for the duration of the propagated pulse. Amplifier 2 provides an additional time delay of $t_d$ caused by its turn-on time delay. Thus, when the propagated pulse emerges from amplifier 2 it has been delayed by a period $2t_d$ relative to the initially applied pulse.

The pulse propagates through the active delay line in this fashion being inverted at the output of each successive amplifier stage and being delayed by a time increment $t_d$ as it passes through each amplifier stage. As can be noted in FIG. 4, the width of the pulse continues to increase, this being a result of the difference between the turn-on and turnoff time delay characteristics.

The first delayed output pulse 40 is illustrated on the line designated "DL–1," this being the output pulse developed by AND-circuit 11 in FIG. 1. This AND circuit receives its inputs from amplifiers 1 and 4. The output of amplifier 1 is inverted and therefore normally positive, whereas the output of amplifier 4 is not inverted and therefore normally zero. Since one of the outputs is positive and the other is zero, the output of AND-circuit 11 is normally zero.

When the propagated pulse passes through amplifier 1, the output of the amplifier drops to zero. Since the normal output of amplifier 4 is zero, both inputs of the AND circuit are zero and therefore the output of AND-circuit 11 becomes positive to product pulse 40. This condition exists until the propagated pulse begins to emerge from amplifier 4 rendering the output of the amplifier positive. When the positive signal from amplifier 4 is applied to AND-circuit 11, the AND circuit is turned off and the output pulse 40 is terminated.

Delayed output pulse "DL–2" is provided by AND circuit 12 having its two inputs connected to the outputs of amplifiers 3 and 6. Accordingly, the output pulse 41 provided by AND circuit 12 begins when the propagated pulse emerges from amplifier 3 and is terminated when the propagated pulse emerges from amplifier 6. In like fashion, delayed output pulse 42 designated "DL–3" is provided by AND-circuit 13 and therefore output pulse 42 is initiated when the propagated pulse emerges from amplifier 5 and is terminated when the propagated pulse emerges from amplifier 8.

It should again be noted that both the turn-on and turnoff of the delayed output pulses are controlled by the leading edge of the pulse being propagated through the amplifiers 1–9. The time delay of the leading edge as the pulse is propagated is affected only by the turn-on time delay for each successive stage and is not affected by the storage time or turnoff time delay. The output pulse width is determined by the turn-on time delay of the three amplifier stages between the two input connections and the AND circuits. In the foregoing example, it was desirable to produce output pulses having a slight overlap and therefore three amplifier stages appear between the AND circuit inputs. One of the inputs should be inverted relative to the other and therefore there should be an odd number of amplifier stages between the inputs. However, if a shorter output pulse is desired, a single amplifier could be connected between the AND circuit inputs, or if a longer pulse is desired, 5, 7 or 9 amplifier stages could be connected between the inputs.

While only one illustrative embodiment of the invention has been described in detail, it should be obvious that there are numerous variations within the scope of the invention. The invention is more particularly defined in the appended claims.

1. A delay line comprising: a series line of active time delay devices interconnected to delay a pulse applied thereto by a predetermined period of time, each device having associated therewith a time delay between different conducting stages in response to an input signal applied thereto, circuit means for applying an input pulse to said time delay devices for propagation down said series line; and a plurality of output circuit means, each being connected to receive pulses from a pair of said time delay devices, and each being operative to produce time delayed output pulses of substantially the same width, the turn-on and turnoff of each output pulse being controlled by the leading edge of the input pulse being propagated down said series line.

2. A delay line according to claim 1 wherein said time delay devices are inverting amplifiers each having a predetermined turn-on delay between nonconducting and conducting states.

3. A delay line according to claim 1 wherein said output circuit means are AND circuits.

4. A delay line according to claim 3 wherein each of said AND circuits includes an input for selectively inhibiting output pulses therefrom.

5. A delay line comprising: a series of active time delay inverting circuits interconnected each to delay the leading edge of a pulse applied thereto by a predetermined period of time required to change said circuit from one state of conduction to another, and each to invert the pulse applied thereto so that said series line provides inverted and noninverted pulses in alternating succession;

circuit means for applying an input pulse to said time delay inverting circuits for propagation down said series line; and a plurality of AND circuits each being connected to said inverting circuits to receive an inverted pulse and a noninverted pulse, and each being operative to produce time delayed output pulses delayed in time from the input pulse and having a duration controlled by the leading edge of the input pulse being propagated down said series line.

6. A delay line according to claim 5 wherein each of said time delay inverting circuits is an amplifier circuit operating in a switching mode between conducting and nonconducting states.

7. A delay line according to claim 6 wherein said amplifiers are integrated circuits each having substantially the same turn-on time delay.

8. A delay line according to claim 5 wherein an odd number of said active circuits is connected between the inputs to each of said AND circuits.

9. A delay line according to claim 8 wherein said odd number is three.

10. A delay line according to claim 7, wherein at least two of said amplifiers are included in a single integrated circuit unit.

11. A delay line comprising a plurality of semiconductive means having inputs and outputs connected in series circuit and each having associated therewith a time delay between different conducting states to respond seriatim to an input signal applied to the input of the first thereof; and at least one AND circuit responsive to the leading edges of the signals at one of said inputs and one of said outputs to produce a time-delayed output signal having a duration related to the time separation of said leading edges.

12. A delay line as set forth in claim 11, wherein the semiconductive means comprises a transistor amplifier operative to provide an inverted output.

13. A delay line as specified in claim 12, wherein each transistor amplifier operates in a switching mode between opposite states of conduction.

14. A delay line in accordance with claim 12, wherein said transistor amplifiers are direct coupled.

* * * * *

UNITED STATES PATENT OFFICE
CERTIFICATE OF CORRECTION

Patent No. 3,622,809 Dated November 23, 1971

Inventor(s) Peter R. Williams

It is certified that error appears in the above-identified patent and that said Letters Patent are hereby corrected as shown below:

On the cover sheet [73] "Chemical Bank, New York, N. Y." should read -- Computer Optics, Inc., Newton, Conn. --.

Signed and sealed this 24th day of October 1972.

(SEAL)
Attest:

EDWARD M.FLETCHER,JR.
Attesting Officer

ROBERT GOTTSCHALK
Commissioner of Patents

ORM PO-1050 (10-69)

USCOMM-DC 60376-P69
☆ U.S. GOVERNMENT PRINTING OFFICE : 1969 O—366-334